(12) United States Patent
Katz et al.

(10) Patent No.: US 7,355,119 B2
(45) Date of Patent: Apr. 8, 2008

(54) CHOKE-PROOF ELECTRICAL CORDS

(76) Inventors: Dov Katz, 12 Harrison Ave., Apt. 2B, Brooklyn, NY (US) 11211; Bezalel Katz, 12 Harrison Ave., Apt., #2B, Brooklyn, NY (US) 11211

( * ) Notice: Subject to any disclaimer, the term of this patent is extended or adjusted under 35 U.S.C. 154(b) by 0 days.

(21) Appl. No.: 11/331,297

(22) Filed: Jan. 11, 2006

(65) Prior Publication Data

US 2007/0158096 A1    Jul. 12, 2007

(51) Int. Cl.
*H02G 3/04* (2006.01)

(52) U.S. Cl. .............................. 174/68.1; 174/DIG. 12; 174/72 A; 174/5 R; 385/135

(58) Field of Classification Search ............... 174/135, 174/68.1, 72 A, 72 C, 73.1, 74 R, 74 A, 174/137 R, 138 R, 136, DIG. 12, 5 R; 24/115 R, 24/129 B, 122.6; 439/135, 136, 137, 138, 439/139; 385/134, 135; 248/49, 51, 68.1

See application file for complete search history.

(56) References Cited

U.S. PATENT DOCUMENTS

| | | | | |
|---|---|---|---|---|
| 5,168,128 A | * | 12/1992 | Thomsen | 174/135 |
| 5,397,243 A | * | 3/1995 | MacMurdo, Sr. | 174/135 |
| D408,365 S | * | 4/1999 | Sanders | D13/153 |
| 6,018,874 A | * | 2/2000 | Todd | 174/136 |
| D445,093 S | * | 7/2001 | Staskey | D13/156 |
| 6,425,165 B2 | * | 7/2002 | Koppang | 24/17 B |
| 6,740,818 B2 | * | 5/2004 | Clark | 174/135 |
| 6,854,990 B2 | * | 2/2005 | Harrell | 439/135 |
| 6,940,018 B1 | * | 9/2005 | Dewhirst | 174/135 |
| 7,029,312 B2 | * | 4/2006 | Reid | 439/367 |
| 7,119,279 B2 | * | 10/2006 | Niehaus et al. | 174/72 A |

* cited by examiner

*Primary Examiner*—Angel R. Estrada
(74) *Attorney, Agent, or Firm*—Ostrolenk, Faber, Gerb & Soffen, LLP

(57) ABSTRACT

An electrical cord which comprises electrical conductors bundled together and electrically insulated from one another to prevent shorting therebetween and having an outer body applied around the cord. The outer body has a series of sections that sequentially follow one another along a length dimension of the cord, with each section comprising a body material that is sufficiently rigid to prevent the body material from being bent by a child during normal use or play. The cord is bendable between the rigid sections.

11 Claims, 1 Drawing Sheet

CHOKE-PROOF ELECTRICAL CORDS

BACKGROUND OF THE INVENTION

The present invention relates to electrical and other types of cords and, more particularly, to a protective wrapping applied to cords made of a stiff material that guards against children choking themselves by wrapping electrical cords or the like around their necks.

Electrical and similar cords are ubiquitous in and around homes, offices and even outdoors. Every year produces new reports of children actually choking themselves or harming other children by wrapping and pulling cords around their necks. Parents and teachers cannot be vigilant enough to prevent accidents of this type.

It is desirable to provide electrical and similar cords which prevent, or at least make it difficult, for accidents of the aforementioned type to occur.

SUMMARY OF THE INVENTION

It is an object of the present invention to provide electrical cords that reduce or eliminate the possibilities of children harming themselves with electrical cords.

It is a further object of the present invention to provide electrical cords of the aforementioned type which are not materially thicker or heavier than existing electrical cords.

It is yet another object of the present invention to provide a protective wrapping that can wrap around electrical cords or the like to prevent harm to children.

The foregoing and other objects of the invention are realized by electrical cords that are constructed from a plurality of sections that are resiliently coupled to one another, with each section being constructed or having applied thereto a relatively stiffened and not easily bendable outer wrapping. Each section should be long enough so that when the cord is bent at its various resilient couplings or living hinges, the interior space of the loop formed by such bending is larger than that which would cause choking in the typical situation.

In one embodiment, the hinge points or locations at consecutive points on the cord are peripherally offset from one another so as to prevent or make it more difficult for a child to bend or manipulate the cord into a closed loop.

In a preferred embodiment, electrical cords, jump ropes and the like are formed with the stiffened sections formed integrally. In other embodiments, the stiffening is applied to existing cords or ropes by inserting an outer wrapping around the cords via a longitudinal slit in the outer stiffened wrappings. Alternatively, the cord may be slipped through the outer wrapping which is in the form of a closed tube, longitudinally.

Other features and advantages of the present invention will become apparent from the following description of the invention which refers to the accompanying drawings.

DETAILED DESCRIPTION OF PREFERRED EMBODIMENTS OF THE INVENTION

Figure 1:
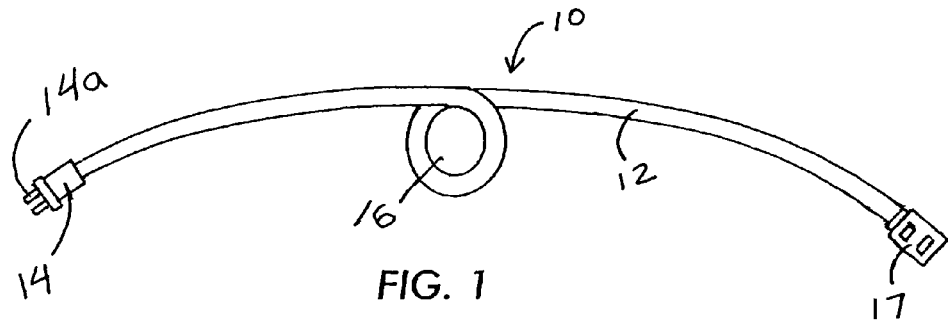
FIG. 1 is a perspective of an existing, prior art electrical cord.

FIG. 1 illustrates a conventional electrical cord 10, of the type which is ubiquitous in homes, offices and everywhere. The electrical cord 10 comprises a flexible body 12 which terminates at one end in an electrical plug 14 having prongs 14a and at the other end, in an electrical socket 17 having sockets 17a for an appliance. Due to the extremely flexible plastic body 12, it is easily possible to manipulate the cord to create loop 16 which can be tightened by pulling on opposite ends. This poses, as noted, a danger to children who sometimes like to play with electrical cords when not supervised by parents, teachers, etc.

Figure 2:
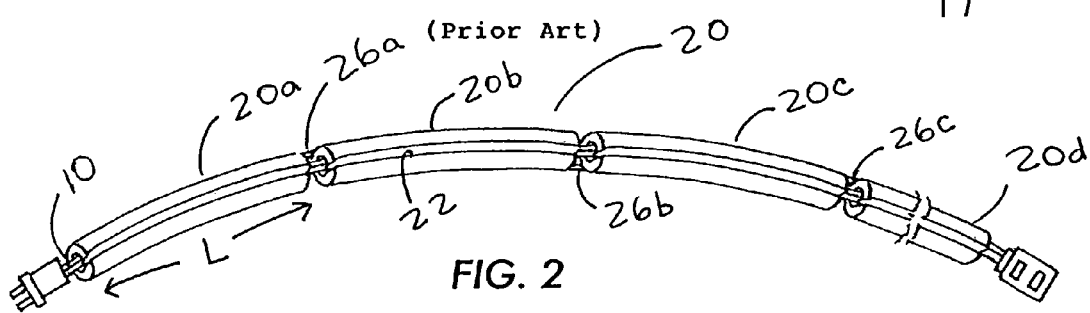
FIG. 2 illustrates a first embodiment of the present invention.

To protect children from the dangers of choking or harming themselves, the electrical cord 10 is shown in FIG. 2 with a stiffened, protective body 20 wrapped around the cord body 12. The stiff body 20 comprises a plurality of sections 20a, 20b, 20, 20d, etc., which are interconnected by respective small webs 26a, 26b, 26c, etc. Each stiff section 20a-20d is constructed of a stiff, comparatively unbendable tubular section made of hard plastic, for example, of the type that is used to wrap coat hanger rods in homes, whereby each section is not easily bendable due by a child. The length "L" of each section can be on the order of 5 to 20 inches, preferably about 4 to 10 inches. Each section 20a has a respective longitudinal slit 22 which can be forced open to insert the cord body 12 therein, the slit, preferably, closing and slightly overlapping its edges to provide a closed look for the finally assembled electrical cord. Preferably the webs 26a, 26b, etc. are circumferentially offset from one another, thereby making it more difficult to create a closed loop. Regardless, even when a loop is formed, the loop will have plenty spaces left around which would likely prevent a child from choking, even if such a cord is wrapped around a child's neck and the opposite ends are pulled in different directions.

Figure 3:
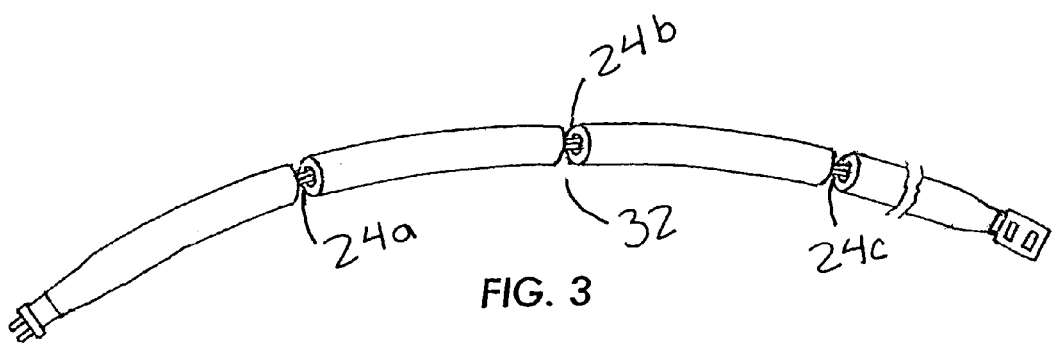
FIG. 3 illustrates an electrical cord within an integrally provided outer stiffened, but bendable, body.

In FIG. 3, and outer stiffened skin 30 is integrally formed with the cord 12, with small breaks 24a, 24b, etc., in the wrappings where the cord is bendable. Thereby, only at the locations of the gaps 24a-24c is the flexible insulation around the internal metallic conductors exposed, allowing bending in those locations.

Figure 4:
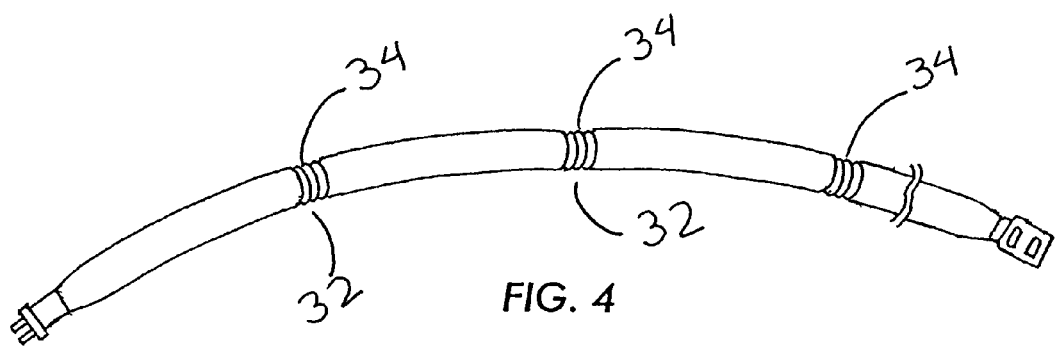
FIG. 4 is a schematic illustrating an accordion style joint between stiffened sections.

For a more aesthetically pleasing appearance, FIG. 4 shows an outer wrapping applied to the cord with the locations 32 being formed of a flexible material that yields to bending or which is in an accordion style 34 to allow bending of the cord thereat.

As described above, electrical cords, or jump ropes and similar devices, or toys or implements are modified to provide increased protection of children misusing or abusing those devices or implements in a manner which can cause them grave harm, serious injury or even fatal results.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electrical chord, comprising:
   electrical conductors bundled together and being electrically insulated to prevent shorting therebetween, said conductors terminating at first and second plug or socket ends of said chord;
   said chord having an outer body formed of a series of sections which extend from said first end to said second end and which sequentially follow one another along a length dimension of said chord, each section comprising a body material that is sufficiently rigid to prevent the body material from being bend by a child during normal use or play with the electrical chord and having a sufficient length to prevent formation of a loop anywhere along said length dimension of said chord capable of choking a child by the loop being placed around the child's neck, and wherein the electrical chord is comprised of an inner body made of flexible material and outer body sections each of which is comprised of a rigid material formed as an elongated tubular section that comprises a lengthwise slit which allows the section to be opened so as to be placed around a section of the inner body of the chord.

2. The electrical chord of claim 1, comprising living hinges between adjacent sections of the body material.

3. The electrical chord of claim 2, wherein the locations of successively located ones of said living hinges are circumferentially offset relative to one another.

4. The electrical chord of claim 1, in which the outer body sections have respective lengths that measure anywhere about four to ten inches.

5. The electrical chord of claim 1, in which the body material of the chord is made of a synthetic material.

6. The electrical chord of claim 1, wherein the lengths of the sections is in the range of about four to fifteen inches.

7. An electrical chord, comprising:
electrical conductors bundled together and being electrically insulated to prevent shorting therebetween, said conductors terminating at first and second plug or socket ends of said chord;
said chord having an outer body formed of a series of sections which extend from said first end to said second end and which sequentially follow one another along a length dimension of said chord, each section comprising a body material that is sufficiently rigid to prevent the body material from being bend by a child during normal use or play with the electrical chord and having a sufficient length to prevent formation of a loop anywhere along said length dimension of said chord capable of choking a child by the loop being placed around the child's neck,
in which the sections are contiguous and connected to each other by accordion style connectors that allow bending of the chord at the locations thereof.

8. The electrical chord of claim 7, wherein the electrical chord is comprised of an inner body made of fully flexible material and an outer body comprised of said sections which are formed as a single elongated member that is tubular and has rigid sections that are connected by resilient sections.

9. An electrical chord, comprising:
electrical conductors bundled together and being electrically insulated to prevent shorting therebetween, said conductors terminating at first and second plug or socket ends of said chord;
said chord having an outer body formed of a series of sections that sequentially follow one another along a length dimension of said chord, each section comprising a body material that is sufficiently rigid to prevent the body material from being bend by a child during normal use or play with the electrical chord and having a sufficient length to prevent formation of a loop capable of choking a child by the electrical chord being placed around the child's neck,
in which the successive sections are joined by flexible joints.

10. An electrical chord, comprising:
electrical conductors bundled together and being electrically insulated to prevent shorting therebetween, said conductors terminating at first and second plug or socket ends of said chord;
said chord having an outer body formed of a series of sections which extend from said first end to said second end and which sequentially follow one another along a length dimension of said chord, each section comprising a body material that is sufficiently rigid to prevent the body material from being bend by a child during normal use or play with the electrical chord and having a sufficient length to prevent formation of a loop anywhere along said length dimension of said chord capable of choking a child by the loop being placed around the child's neck,
wherein the electrical chord is comprised of an inner body made of fully flexible material and an outer body comprised of said sections which are formed as a single elongated member that is tubular and has rigid sections that are connected by accordion style connectors and which further comprises a lengthwise extending slit that enables the outer body to be removeably placed around and wrap said inner body of said electrical chord.

11. A cord, comprising:
an inner body;
said inner body having an outer wrapping formed of a series of sections that sequentially follow one another along a length dimension of said cord, each section comprising a body material that is sufficiently rigid to prevent the body material from being bent by a child during normal use or play with the cord and having a sufficient length to prevent formation of a loop capable of choking a child by the cord,
wherein the series of sections are joined by connection portions that are made of flexible and bendable material.

* * * * *